United States Patent
Qiu et al.

(10) Patent No.: US 10,872,253 B2
(45) Date of Patent: Dec. 22, 2020

(54) METHOD AND APPARATUS FOR VEHICLE INTERIOR EVALUATION AND SITUATIONAL SERVICING

(71) Applicant: FORD GLOBAL TECHNOLOGIES, LLC, Dearborn, MI (US)

(72) Inventors: Shiqi Qiu, Canton, MI (US); Fling Tseng, Ann Arbor, MI (US); Johannes Geir Kristinsson, Ann Arbor, MI (US); Helen Elizabeth Kourous-Harrigan, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 96 days.

(21) Appl. No.: 16/271,101

(22) Filed: Feb. 8, 2019

(65) Prior Publication Data
US 2020/0257912 A1 Aug. 13, 2020

(51) Int. Cl.
G06K 9/00 (2006.01)
B25J 11/00 (2006.01)
G06K 9/46 (2006.01)

(52) U.S. Cl.
CPC ....... *G06K 9/00832* (2013.01); *B25J 11/0085* (2013.01); *G06K 9/46* (2013.01)

(58) Field of Classification Search
CPC .... B25J 11/0085; G06K 9/00832; G06K 9/46
See application file for complete search history.

(56) References Cited

U.S. PATENT DOCUMENTS

| | | | |
|---|---|---|---|
| 9,327,645 B2* | 5/2016 | Raman | B60Q 9/00 |
| 9,411,337 B1* | 8/2016 | Theobald | B25J 5/005 |
| 9,855,926 B2 | 1/2018 | Stauffer et al. | |
| 2013/0211976 A1* | 8/2013 | Breed | G08B 25/08 |
| | | | 705/28 |
| 2015/0321595 A1* | 11/2015 | Hempsch | B60P 3/007 |
| | | | 414/812 |
| 2016/0332535 A1* | 11/2016 | Bradley | B60R 11/04 |
| 2017/0080900 A1 | 3/2017 | Huennekens et al. | |
| 2017/0330144 A1* | 11/2017 | Wakim | G01C 21/34 |
| 2018/0024554 A1* | 1/2018 | Brady | G06Q 10/08 |
| | | | 701/23 |
| 2018/0126960 A1 | 5/2018 | Reibling et al. | |
| 2018/0186454 A1* | 7/2018 | Luckay | G05D 1/0094 |

(Continued)

*Primary Examiner* — Li Liu
(74) *Attorney, Agent, or Firm* — Gregory P. Brown; Brooks Kushman P.C.

(57) ABSTRACT

A vehicle may be configured to detect an object within an interior of the vehicle using a vehicle sensor. The vehicle may further determine whether the object should be removed, based on a determined object value, such as may be determined by comparison of an object characteristic to a database of objects. Also, responsive to determining the object should be removed, the vehicle may schedule removal at an automated object-removal center. The vehicle may also wirelessly notify the object-removal center of vehicle arrival when the vehicle arrives at the object-removal center, including sending identification of the object, receiving indication from the object-removal center that the object has been removed, and confirming removal of the object by attempting to detect the object using the vehicle sensor, the confirmation occurring based on non-detection of the object by the vehicle that originally detected the object and requested removal.

9 Claims, 4 Drawing Sheets

(56) References Cited

U.S. PATENT DOCUMENTS

2019/0251376 A1\* 8/2019 Stoffel .................... H04W 4/44
2019/0361441 A1\* 11/2019 Brettschneider ....... G06Q 10/08
2020/0121533 A1\* 4/2020 Will, IV ................ G16H 40/20

\* cited by examiner

METHOD AND APPARATUS FOR VEHICLE INTERIOR EVALUATION AND SITUATIONAL SERVICING

TECHNICAL FIELD

The illustrative embodiments generally relate to methods and apparatuses for vehicle interior evaluation and situational servicing.

BACKGROUND

Autonomous vehicles may operate in a vehicle-as-a-service model, which may embody a fleet of vehicles that are ordered and used in an on-demand manner. Just as with a taxi or ride-shared vehicle, it is possible for occupants to leave objects behind in a vehicle cabin, or simply to generally leave a mess (e.g., food, spilled drink, etc.). Unlike the human driven taxis and ride-shared services, however, there is no driver in the autonomous model. Thus, there is no one to notice when an object is left behind or a drink is spilled.

With vehicles potentially servicing tens, if not hundreds, of occupants a day, there is significant opportunity for spillage and objects left behind in every vehicle. This presents opportunities to irritate other passengers in the case of mess, and opportunities for permanently lost items in the case of objects left behind.

SUMMARY

In a first illustrative embodiment, a system includes a processor configured to detect an object within a vehicle interior using a vehicle sensor. The processor is further configured to determine whether the object should be removed, based on a determined object value. The processor is also configured to, responsive to determining the object should be removed, schedule removal at an automated object-removal center. Further, the processor is configured to wirelessly notify the object-removal center of vehicle arrival when the vehicle arrives at the object-removal center, including sending identification of the object, receive indication from the object-removal center that the object has been removed, and confirm removal of the object by attempting to detect the object using the vehicle sensor, the confirmation occurring based on non-detection of the object.

In a second illustrative embodiment, a system includes a robotic removal device, equipped with a sensor and a processor configured to receive wireless identification of an object, from a vehicle from which the object is to be removed. The processor is also configured to guide the removal device within a vehicle interior to identify, using the sensor, the object based on the identification. Further, the processor is configured to secure and remove the object using the removal device. The processor is also configured to place the object in a locking receptacle, create temporary access parameters for the locking receptacle, and wirelessly communicate the access parameters to an object owner, having a predefined association with the object.

In a third illustrative embodiment, a system includes a processor configured to use a robotic removal device to secure and remove an object, wirelessly identified by a vehicle, from an interior of the vehicle. The processor is also configured to confirm with the vehicle, via wireless communication, that the identified object was removed, based on the vehicle confirming that the vehicle no longer senses the object. This removal can also include using robotic arms, drones and other robotic devices to change odor (via alterant dispensing), wipe surfaces and dry wet areas or spills.

DETAILED DESCRIPTION

As required, detailed embodiments are disclosed herein; it is to be understood, however, that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

While it may be possible for an autonomous vehicle to report for regular (e.g., hourly) maintenance and cleaning, this may prove to be a highly inefficient solution. In addition to resulting in servicing of clean and empty vehicle interiors, a regular process such as this may avoid recovery of left-behind objects in a manner that causes significant user-issues. The illustrative embodiments provide systems and methods for scanning the interior of a vehicle, identifying a rectifiable issue (e.g., object, spilled liquid or food, trash, etc.) and scheduling rectification of the issue. This addressing of issues with the interior of the vehicle can be used in conjunction with regular servicing, if desired, but should help avoid scenarios where excessive mess or expensive objects left-behind cause issues for the vehicle owner/provider.

For example, working in conjunction with a fleet of autonomous vehicles, a cloud-based servicing system can, for example, maintain a database of available service stations. This system can also maintain compatibility data, in the event that certain stations are only compatible with certain vehicles. The system can also determine which services are available at which stations.

This centralized system can schedule and route vehicles to the appropriate service stations. The system may also, for example, be responsible for arranging delivery coordination when items are left behind in autonomous vehicles (AVs) and are retrieved by service stations.

Service stations themselves may be small-footprint robotic centers that can scan interiors, clean interiors, retrieve objects, store objects and schedule object pickup. In some examples, higher capability centers may also exist, for handling large object removal or heavy cleanup. This can allow for cheaper placement of fast-service centers in small footprint areas along with centralized placement of higher-capability servicing in centers that may be more expensive to provide but more comprehensive in service offerings. Robotic arms that can remove valuable objects can also perform cleaning, and they may be further capable of cleaning the vehicle interior through additional arms or attachments, including, for example, waste removal, dusting, wiping, odor removal, etc. Just as the illustrative embodiments describe instances where a vehicle may need to travel to a station for removal of a valuable object, vehicles with spills, odors, long usage times between cleanings and/or food-type left-behind objects may also need to stop at a station for cleaning.

A small footprint service center may include, for example, a set of lockable containers with a vacuum and a robotic arm included therewith. A human machine interface (HMI) may also be provided for assisting in user object retrieval, but such a center may occupy no more than a parking space or two in a lot, and thus may be suitable for placement in virtually any location.

An expanded-function center, with, for example, washing capability and large object storage, may more closely resemble modern refueling stations and may require larger footprints. Both centers could potentially be completely autonomous and queue and service vehicles through wireless communication, without the necessary presence of a human operator.

By accommodating and allowing for automatic scanning for mess and objects, and rectification of the same, the illustrative embodiments improve the efficiency and overall effectiveness of autonomous fleets. Customer satisfaction can be maintained through retrieval of objects and removal of objectionable messes. Further, the vehicles may be serviced as needed, and at appropriate locations, both improving servicing and maintaining localization of vehicles by servicing the vehicles without necessarily requiring them to travel to logistically undesirable locations. The uncommon and atypical examples and concepts described herein demonstrate potential improvements achievable through use of those examples, concepts, and the like.

Figure 1:
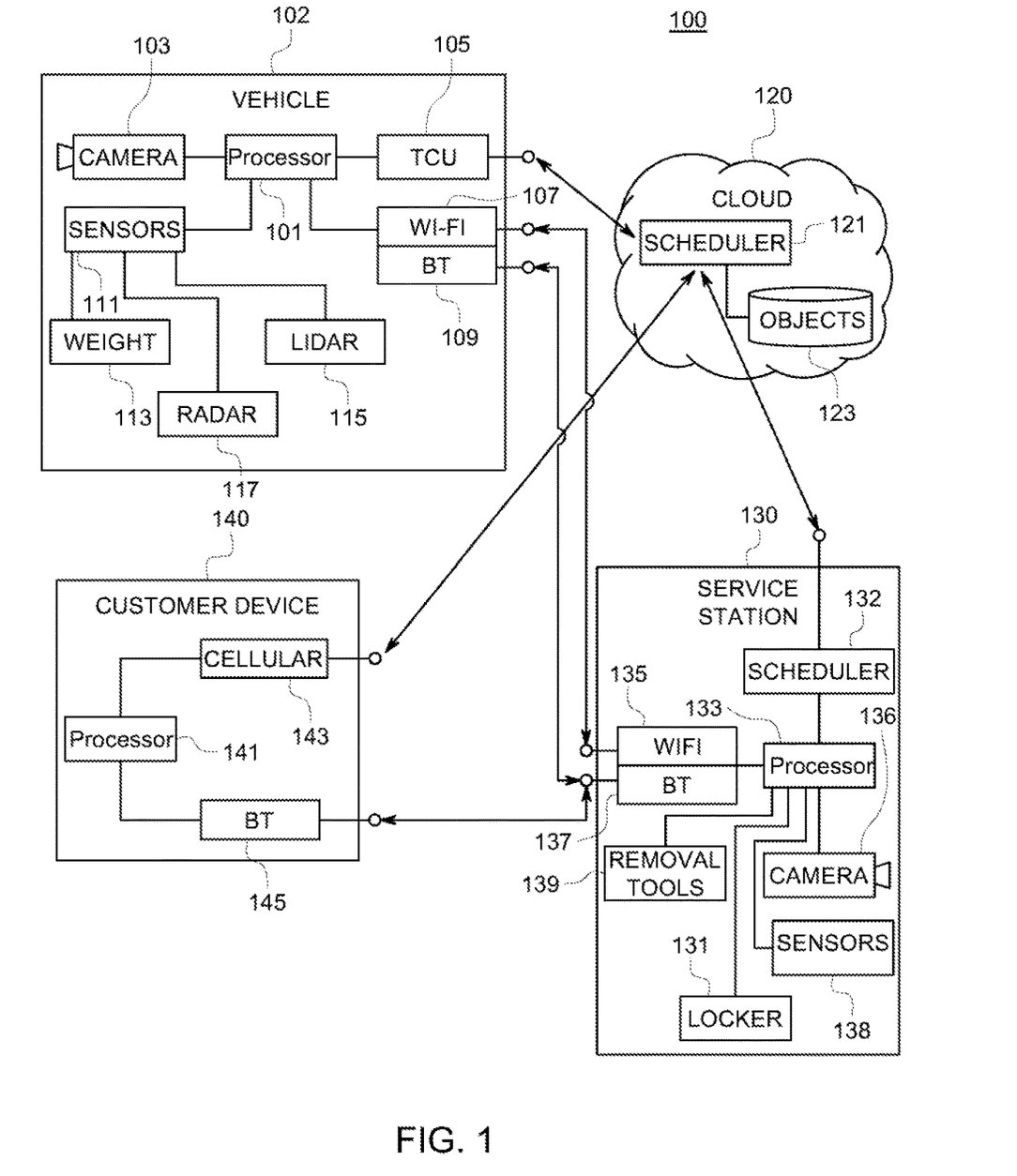
FIG. 1 shows an illustrative vehicle evaluation system.

FIG. 1 shows an illustrative vehicle evaluation system 100. In this illustrative system 100, an illustrative autonomous vehicle 102 is shown. The system 100 also includes, for example, a customer device 140, a central cloud coordination system 120 and an illustrative service station 130. Each component is shown for illustration only and may include more, fewer, or different components and elements than those shown for illustration.

In this illustrative system 100, the vehicle 102 may include a central processing unit 101 controlling, for example, one or more cameras 103. These cameras 103 may include vision system cameras and may be able, in conjunction with the central processing unit 101, to determine if a cabin interior image does not match an expected image. This can include the presence of a foreign object and/or the presence of a discoloration that may represent a spill or trash. Other sensors 111 can also be included, such as weight 113, RADAR 115 and LIDAR 117 sensors. While not shown in the system 100, odor detection and other spill and object detecting sensors may further be included within the vehicle 102. As an example of an object detection sensor, a wireless signal sensor may sense a wireless device signal indicating a smartphone or other mobile device was left in the cabin of the vehicle 102. Using data from these various sensors, the vehicle 102 can identify the existence of areas to be wiped or dried and the locations of those areas, and/or identify the existence of an odor and request that the station 130 utilize an odor alteration dispenser.

The vehicle 102 may also include a telematics control unit (TCU) 105, which is capable of communication with a remote server through an onboard vehicle modem. Onboard Wi-Fi 107 communication and BLUETOOTH communication 109 can provide both local communication services (in-vehicle and vehicle-proximate) as well as long range communication services through an access point. In this example, the vehicle 102 uses the TCU 105 for remote communication with the cloud and BLUETOOTH and/or Wi-Fi for communication with the service center 130.

Responsive to a passenger leaving an object behind in the vehicle 102, the sensors and detection systems may detect the left-behind object. The vehicle 102 may alert the scheduler 121 in the cloud, which can perform several functions. For example, the scheduler 121 can find an available service center and set up a service call for object removal. The scheduler 121 can also access a database of objects 123 to determine the relative value of an object that was left behind. For instance, a higher relative value may be ascribed to a cellular phone compared to the value given to a coffee mug. The scheduler 121 may also communicate with a customer device 140 via a cellular connection. Using the cellular connection, the scheduler 121 may receive information from the customer to identify the value of the object and indicate whether retrieval is desired and whether retrieval is important. In instances where a low-value object, such as a water bottle or coffee mug, is left behind, the system 100 may not immediately schedule retrieval.

A processor 141 of the customer device 140 can receive the communication from the remote server and store, for example, an access code or identifier that can be sent via BLUETOOTH from a BLUETOOTH module 145 to the service station 130 when the customer arrives.

The service station 130 may, for example, have service lockers 131 that can be loaded by removal tools 139 such as robotic removal devices. These systems may be controlled by one or more processors 133 of the service station 130. A scheduler process 132 executed by the processor 133 may determine which vehicle 102 is up for service, and the vehicle 102 may communicate via a Wi-Fi transceiver 135 or a BLUETOOTH transceiver 137 when it arrives. The communication may also include identification of the object or spill to be rectified. The presence of the spill or item may be verified by a camera 136 or sensors 138, which may be included with a robotic arm or position to view/scan the vehicle interior.

The system 100 may then utilize a robotic arm or other removal tools 139 (which could function in conjunction with the camera 136 or sensors 138) to grasp/secure the object and place the object into the locker 131. In an example the removal tools 139 can include a robotic arm with a grasping portion, suction portion, etc. In another example, the removal tools 139 may include a drone similarly equipped as having a robotic arm. The processor 133 can register the locker 131 with the object, vehicle 102 and/or related customer, and when the customer with a device including the appropriate identification later arrives, the customer can send a signal to the processor 133 to unlock the locker 131. The customer may also have a personal identification number (PIN) or other way of achieving access to the locker 131. In this manner, left-behind objects can be secured and retained for customer retrieval.

Figure 2:
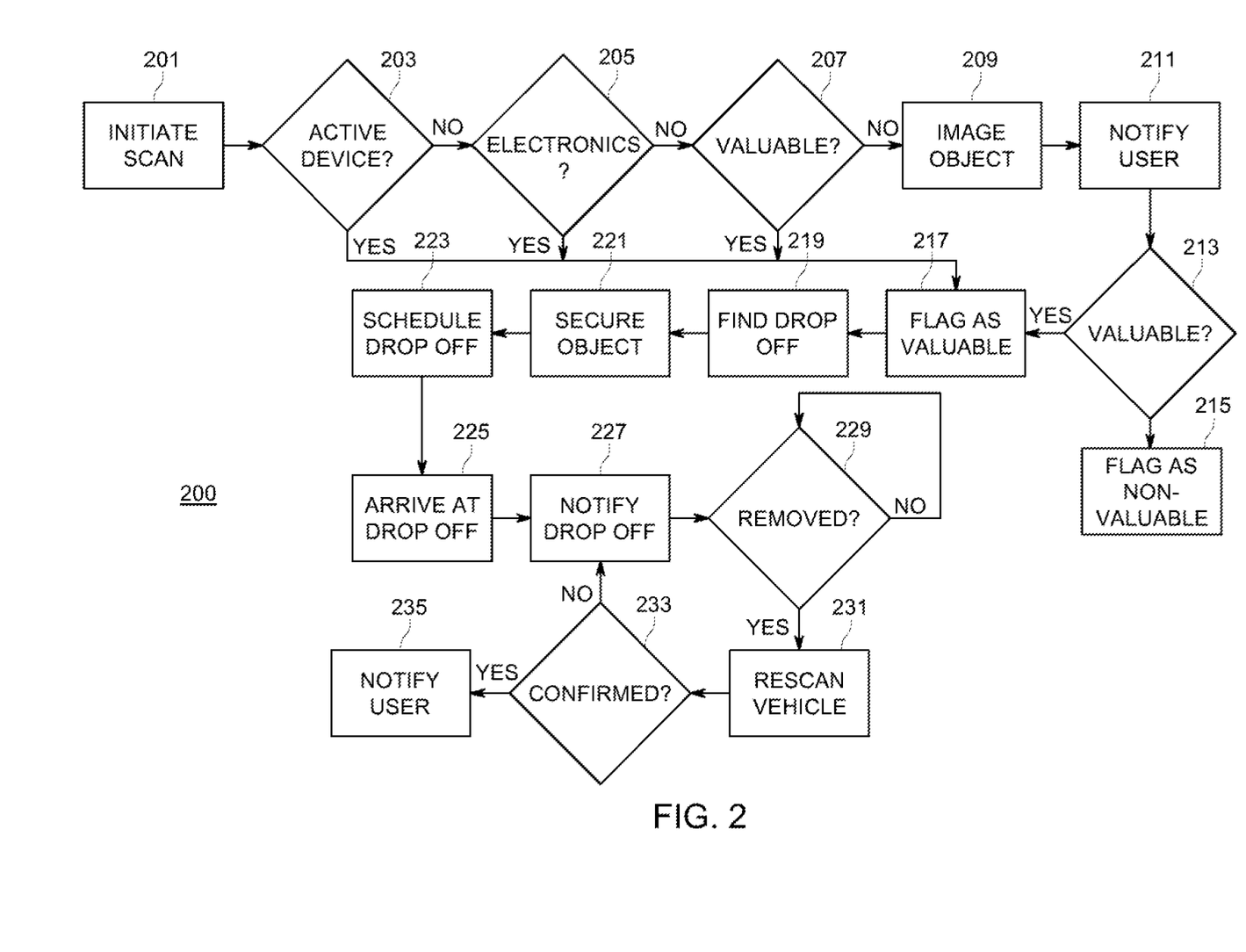
FIG. 2 shows an illustrative example of a vehicle evaluation process.

FIG. 2 shows an illustrative example of a vehicle evaluation process 200. In an example, the process 200 may be performed by elements of the system 100 described in detail above. For instance, the vehicle 102 may initiate a cabin scan at 201. This may be at a point when there are no users in a vehicle 102, or the scan may cover a limited area not currently occupied by any humans. Typically, the system 100 will not schedule cleaning while occupants are in the vehicle 102, but for egregious messes exception may be made (users could be transferred to other vehicles 102 along the way).

In this example, the process 200 executes via the processor 101 when the vehicle 102 is empty of passengers and determines, for example, whether a device signal is detected at 203. The illustrative examples pertain to the identification of objects, but similar techniques could be used to detect messes within the vehicle.

If there is no device signal, the process also attempts to determine if the left-behind device is an electronic device (e.g., has the shape of a tablet, watch, phone, etc.) at 205. The process may also attempt to determine if the left-behind object is a valuable object at 207. Some determinations may involve communication with the cloud 120 and a comparison of the objects to a database 123 of visually identifiable objects or use of an object identification application or service.

If the object is identifiable, by the vehicle 102, as valuable, the process at 217 may flag the object as valuable. If the vehicle cannot identify the object, the process may image the object at 209 and send the image at 211 to the user who is projected to have left the object behind (e.g., one or more of the last occupant(s)). If the user confirms the value of the object at 213, or offers to pay to retrieve the object (retrieval may involve a cost), the process may flag the object as valuable at 217. Otherwise, the process may flag the object as non-valuable at 215 and suitable for retrieval by the service station 130 when convenient or necessary (i.e., the vehicle 102 may not immediately re-route to a service station 130).

If the vehicle 102 includes one or more valuable objects, the process may determine a drop off location at 219. The drop off location may be, for example, the closest location to a vehicle location that can service the removal, the closest or a suitable location for user retrieval (e.g., somewhere near the user who is picking up the object), or a location that places the vehicle 102 being serviced in a suitable location for a next-pickup. For example, if there is a low demand for vehicles 102, the process may send the vehicle 102 to a service station 130 near to a user location. If there is a high demand for vehicles 102 in the area where the vehicle 102 is located, the process may send the vehicle 102 to the nearest service station 130. If there is a high demand for vehicles 102 in another area, the process may send the vehicle 102 to a service station 130 in the other area for servicing, so the vehicle 102 is immediately available for use in the high demand area following servicing.

If possible, the vehicle 102 may also attempt to secure the object at 221. For example, this may involve a small mechanical arm or drone inside the vehicle 102, retrieving the object and placing the object in a secure storage location. Similar to the services station tools 139, the securing can include use of a robotic arm with a grasping portion, suction portion, etc. A drone could be similarly equipped, and the vehicle 102 may have multiple tools for removal, depending on the object size, shape, location, etc. If the object can be secured, the vehicle 102 may be able to delay servicing. If the object cannot be secured, the vehicle 102 may require immediate servicing. Once the vehicle 102 schedules an object drop off and location at 223, the vehicle 102 may travel to the service station 130 at the location.

When the vehicle 102 arrives at the service station 130 location at 225, the process may notify the service station 130 that the vehicle 102 has arrived at 227. The process may also notify a user device 140 that drop-off is imminent at 227. Once the object is removed at 229, the process may rescan the vehicle 102 at 231. The removal of the object may initially be indicated by the service station 130, and the rescan can confirm if the service station 130 is correct.

If the process confirms that the object has been removed at 233, the process may notify the user at 235. This can include, for example, sending a locker identification and/or a code to the user device 140. These and other received access credentials may be usable to access the locker when the user arrives at the service station 130.

Figure 3:
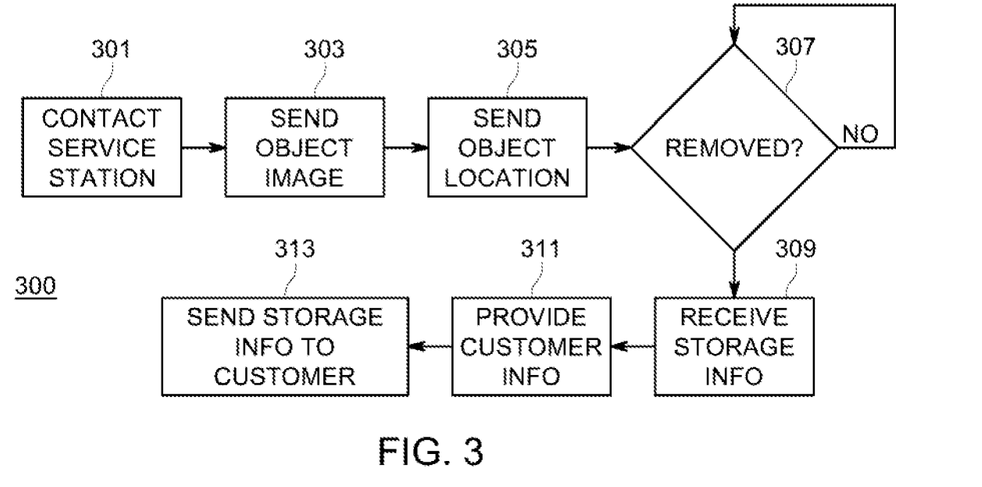
FIG. 3 shows an illustrative example of a rectification scheduling process.

FIG. 3 shows an illustrative example of a rectification scheduling process 300. In this example, the process 300 executing on the vehicle 102 via the processor 101 may contact the service station 130 at 301 and send an image of the object to be removed or the spill to be cleaned up at 303. The vehicle 102 may also send some form of vehicle cabin coordinates or a vehicle cabin location where the object/spill is located, within the vehicle, at 305.

For instance, upon arrival, or via the scheduler, the vehicle 102 may send an image of a phone and the location "rear left seat" or a coordinate system established for the vehicle interior at 305. This can also assist the station 130 in determining whether the station 130 can remove the object (e.g., does the station 130 include a suitable tool) and/or which tool to use to remove the object.

Once the station 130 confirms removal of the object and the vehicle 102 verifies removal of the object at 307, the vehicle 102 may receive storage information from the service station 130 at 309. For example, the service station 130 can remove a phone and place it in locker 131 twenty-one, and the vehicle 102 may receive indication that the object is in locker 131 twenty-one. This received data may also include identification of an access code for the locker 131. Additionally or alternatively, as in this example, the vehicle 102 may also provide the service center at 311 with a customer identification (e.g., a customer ID number or biometric) and/or a preferred access code or device identification usable to access the locker 131 when the customer arrives.

Before, after, or at the same time, the vehicle 102 and/or the service station 130 may send the storage station 130 location, locker 131 identification and/or access information to the customer at 313. For example, after storing the device in locker 131 twenty-one, the service station 130 may receive the customer device 140 ID and an access code (e.g., 1234). The customer may then receive the storage station 130 location, the locker ID of twenty-one and an image of the retrieved object. Upon arriving at the center, the customer may input an ID via an onsite interface or connect the identified device 140 to the service station 130 via a wireless connection. Using the access code (or the access code and the locker ID, if the customer has no device 140 to connect), the customer may access the storage locker 131 and retrieve the stored object. This can also result in confirmation being sent to the cloud 120 that the object was successfully retrieved, which can also trigger a charge-event if the customer is paying for the retrieval service.

Figure 4:
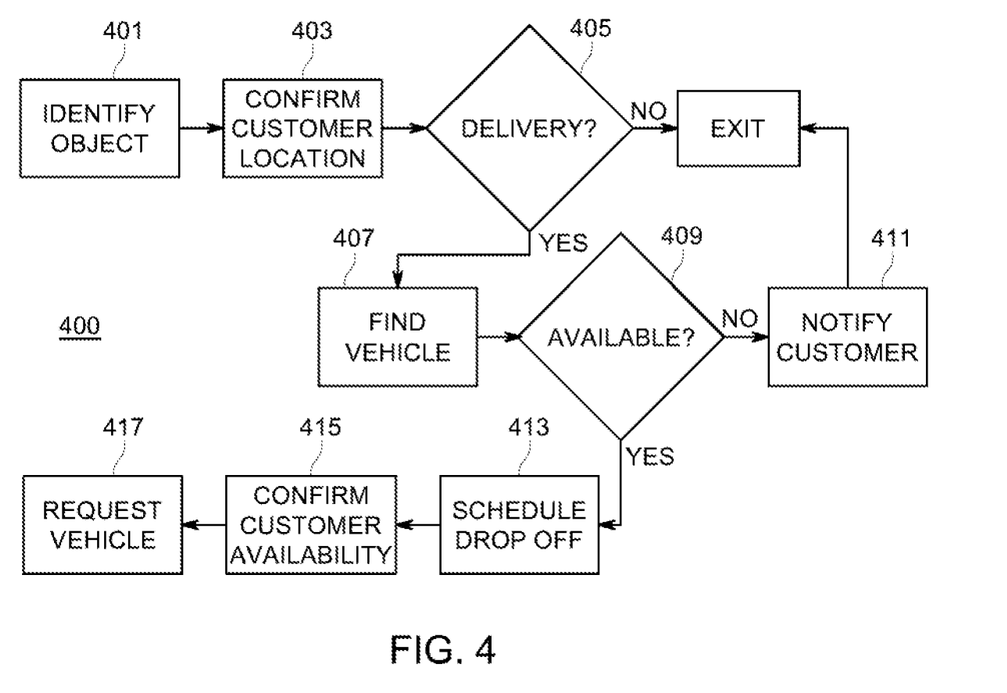
FIG. 4 shows an illustrative example of an object return process.

FIG. 4 shows an illustrative example of an object return process 400. In this example, the process 400 executing on a vehicle 102 processor 101 may identify the object at 401 and/or whether the object is valuable or requested for retrieval. The vehicle 102 may also confirm a customer location at 403, which may be useful if the process 400 is designed to accommodate a present customer location when determining where to drop off the object.

In certain examples, the process 400 may actually be configured to instruct delivery of the object to the customer. Mobile locker vehicles and other vehicles equipped for delivery services may be enabled to interact with an object vehicle 102 including the object, retrieve the object and deliver the object to a customer.

If delivery is available and/or requested, the vehicle 102 may attempt to find a delivery vehicle at 407. If there is no vehicle available at 409, the vehicle 102 may notify the customer that delivery is unavailable at 411. In such an instance, the vehicle 102 may continue with object drop off at a service station 130. It is also possible for later-available delivery vehicles to retrieve objects from service stations 130 and deliver those objects to customers.

If a vehicle 102 is available to deliver the object, the process may schedule a drop-off with the customer at 413. While it is certainly possible for the original vehicle 102 to deliver the object, in some examples it may be more useful to have a single delivery vehicle with the capability to retrieve and store many objects. This allows the delivery vehicle to retrieve objects as convenient, hold the objects and plan deliveries in an efficient manner, while the original vehicle(s) 102 can continue to service riders.

Once the service vehicle confirms the drop off availability at 415, the process may request at 417 that the vehicle come and retrieve the object. As noted, object retrieval may occur via a service vehicle even if the customer is not immediately available. The service vehicle may even drop the object off at a service station 130, if a drop-off with the customer cannot be arranged.

Figure 5:
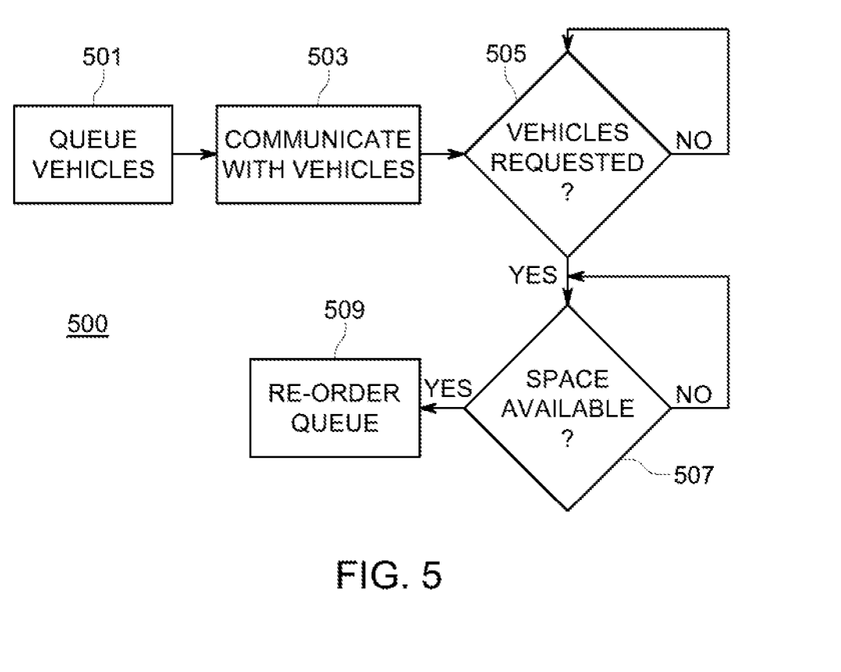
FIG. 5 shows an illustrative vehicle queue handling process.

FIG. 5 shows an illustrative vehicle queue handling process 500, executable by a service station processor 133 and/or scheduler 132. In this example, the station 130 may queue vehicles 102 at 501 as they arrive at the service station 130. While it is certainly possible to service vehicles 102 in a first-in first-out manner, it may also be reasonable to service requests based on, for example, vehicle 102 need, projected service times, etc.

For example, if a vehicle 102 is scheduled for a rider pickup, it may have a ten-minute window for servicing, and may be placed in a queue ahead of earlier-arriving vehicles 102 that are not scheduled for rider-request handling. Alternatively, if a vehicle 102 has a spill that will require a projected thirty-minute cleanup, that vehicle 102 may temporarily be taken out of service and serviced as timing allows, which can include, for example, partial servicing when time is available. Even though it may take longer than thirty minutes to complete the servicing when considering the wait time, this allows multiple other vehicles 102 with lower servicing times to be serviced while the vehicle 102 with the large spill waits for an opportunity to be serviced.

In this example, the station 130 communicates at 503 with waiting vehicles 102, to determine if a given vehicle 102 is requested for use by a rider at 505. This is not the only reason a vehicle 102 may be moved up or down in a queue, as noted, but rather is an example of a reason why a vehicle 102 may be given priority.

If a given vehicle 102 is requested for use by a rider, the station 130 may also determine if any service space is available in the queue at 507. Some service stations 130 may have multiple tools 139 that can service multiple vehicles 102 at the same time. Other times, the available space may simply refer to a higher priority slot in the queue. If a vehicle 102 is near completion of servicing, for example, even if that particular vehicle 102 is not requested for user pickup, the center may complete servicing of that vehicle 102 first. On the other hand, if the non-requested vehicle 102 has more than a projected threshold of servicing time remaining, for example, the station 130 may instruct that vehicle 102 to move and may give priority at 509 to another vehicle 102 that was requested for rider use. Any reasonable parameters may be used for requeuing vehicles 102, which can even include, for example, prioritizing spill cleanup on hot days where spills may result in permanent damage to a vehicle 102 interior.

The illustrative embodiments accordingly allow for automated determination by a vehicle 102 of objects and spills that are left behind by vehicle occupants. Moreover, the described embodiments also provide for autonomous servicing of vehicles 102 to address objects and spills that are left behind, so that the vehicles 102 can be more efficiently and effectively serviced.

Computing devices described herein generally include computer-executable instructions where the instructions may be executable by one or more computing devices such as those listed above. Computer-executable instructions, such as those of the processes described herein, may be compiled or interpreted from computer programs created using a variety of programming languages and/or technologies, including, without limitation, and either alone or in combination, JAVA™, C, C++, C #, VISUAL BASIC, JAVASCRIPT, PYTHON, JAVASCRIPT, PERL, PLSQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a robotic removal device, equipped with a sensor; and
a processor configured to receive wireless identification of an object, from a vehicle from which the object is to be removed;
guide the removal device within a vehicle interior to identify, using the sensor, the object based on the identification;
secure and remove the object using the removal device;
place the object in a locking receptacle;
create temporary access parameters for the locking receptacle; and
wirelessly communicate the access parameters to an object owner, having a predefined association with the object.

2. The system of claim 1, wherein the removal device includes a robotic arm.

3. The system of claim 2, wherein the removal device includes a grasping portion configured to grasp an object.

4. The system of claim 2, wherein the removal device includes a suction portion configured to secure an object.

5. The system of claim 1, wherein the removal device includes a drone capable of securing the object.

6. The system of claim 1, wherein the wireless identification includes an image of the object.

7. The system of claim 1, wherein the wireless identification includes a location of the object within a vehicle interior.

8. The system of claim 1, wherein the processor is configured to communicate the wireless access parameters to an object owner's mobile device and to receive local wireless communication from the mobile device, including the access parameters, responsive to the owner arriving at a site including the locking receptacle.

9. The system of claim 8, wherein the processor is configured to provide access to the locking receptacle responsive to the local wireless communication.

* * * * *